United States Patent [19]

Brown

[11] Patent Number: 6,149,835
[45] Date of Patent: Nov. 21, 2000

[54] METHODS FOR TREATING REGULATED WATERS WITH LOW LEVELS OF OXIDIZING HALOGENS AND HYDROGEN PEROXIDES

[75] Inventor: Geoffrey A. Brown, Lithonia, Ga.

[73] Assignee: Great Lakes Chemical Corporation, West Lafayette, Ind.

[21] Appl. No.: 09/268,891

[22] Filed: Mar. 16, 1999

Related U.S. Application Data

[63] Continuation-in-part of application No. 08/874,105, Jun. 12, 1997, Pat. No. 5,882,526.

[51] Int. Cl.$^7$ .................................................. C02F 1/72
[52] U.S. Cl. ............................ 252/175; 424/661; 424/723
[58] Field of Search .......................... 252/175; 424/661, 424/723

[56] References Cited

U.S. PATENT DOCUMENTS

| | | | |
|---|---|---|---|
| 3,483,120 | 12/1969 | Hatch | 210/50 |
| 5,478,482 | 12/1995 | Jones et al. | 210/753 |
| 5,662,940 | 9/1997 | Hight et al. | 424/661 |

FOREIGN PATENT DOCUMENTS 657897  12/1994  Australia .

OTHER PUBLICATIONS

Worley, S.D. and Williams, D.E., "Halamine Water Disinfectant," *CRC Critical Review in Environmental Control*, vol. 18, Issue 2, 1988, pp. 133–175.

White, G.C., "Dechlorination," in *The Handbook of Chlorination*, 2$^{nd}$ ed., by Van Nostrand Reinhold Company, Inc., 1986, pp. 755–788.

Rauhut, M.M., "Chemiluminescence," in *Kirk–Othmer Encyclopedia of Chemical Technology*, by John Wiley & Sons (New York). vol. 5, 1984, pp. 416–450.

*Primary Examiner*—Duane Smith
*Assistant Examiner*—Betsey Morrison Hoey
*Attorney, Agent, or Firm*—Woodard, Emhardt, Naughton Moriarty & McNett

[57] ABSTRACT

This invention provides a method for maintaining effective concentrations of halogen oxidizing agents and hydrogen peroxide in waters to inhibit growth of bacteria and algae. There is also provided a composition comprising a halogen source, an activated amine, such as sulfamic acid, and hydrogen peroxide for water treatment.

2 Claims, No Drawings

METHODS FOR TREATING REGULATED WATERS WITH LOW LEVELS OF OXIDIZING HALOGENS AND HYDROGEN PEROXIDES

CROSS-REFERENCE TO RELATED APPLICATION

The present application is a continuation-in-part of U.S. patent application Ser. No. 08/874,105 filed on Jun. 12, 1997, now U.S. Pat. No. 5,882,526, issued Mar. 16, 1999, which is hereby incorporated by reference in its entirety.

FIELD OF INVENTION

The present invention relates generally to methods of treating regulated waters, and more particularly to methods of treating water with both halogenated and non-halogenated oxidizing agents.

BACKGROUND OF THE INVENTION

The clarity of recreational waters is an important measure of overall water quality. Water can become cloudy as bacteria (dead and alive) and swimmer wastes accumulate, overwhelming the system's filtering capacity. Oxidizers such as chlorine, bromine, hydrogen peroxide and potassium peroxymonopersulfate are routinely used to achieve and maintain clear water. However, there are drawbacks to using oxidizers to fulfill this function. For example, chlorine and bromine levels must be maintained at levels of 1–3 ppm (as $Cl_2$) and periodic superchlorination may be required to assure microbiological control and adequate water quality. Hydrogen peroxide and potassium peroxymonopersulfate must be used in much higher concentrations because they are weaker oxidizers than chlorine and bromine.

In spite of the drawbacks identified above, chlorine is still the most widely used water sanitizer because of its effectiveness and relatively low cost. In recreational waters, chlorine provides clean, clear water as long as its levels are appropriately maintained. However, as chlorine has come under sustained environmental scrutiny, the need for efficacious, low or non-chlorine alternatives has arisen. Moreover, recreational customers often complain of skin and eye irritation as well as discolored swimming wear after swimming in halogenated water.

As a result, the use of non-halogenated sanitizers and oxidizers has increased throughout the water treatment industry. For example, hydrogen peroxide has gained increasing acceptance in the pool and spa industry for oxidation. Consumers have indicated that peroxide-treated water is less irritating than chlorinated waters, and will not bleach swim wear or pool surfaces.

However, pools treated with peroxide can develop problems with recalcitrant biofilms such as pink slime, mustard algae and white water mold. When problems such as these are encountered, treatment options are limited since hydrogen peroxide is incompatible with traditional oxidizers such as chlorine, bromine and potassium peroxymonopersulfate. Hence, it is not uncommon for peroxide users to spend considerable amounts of time and money to remove and kill resistant microbial growths. By contrast, when similar problems arise in pools treated with halogen sanitizers, they can usually be remedied quickly and inexpensively.

Methods for combining halogen oxidizers with hydrogen peroxide have not been developed, due to the incompatibility problems noted above. A need therefore exists for a method of combining halogen and peroxide sanitizers so that both may be used simultaneously in water. The present invention addresses that need.

SUMMARY OF THE INVENTION

Briefly describing one aspect of the present invention, there is provided a method of simultaneously maintaining effective amounts of hydrogen peroxide and halogen oxidizer in water. In one preferred embodiment, a halogen oxidizer such as chlorine, is combined with an activated amine such as sulfamic acid, to provide an N-halomine such as chlorosulfamate. The chlorosulfamate has surprisingly been found to be able to coexist in water with peroxide for substantial periods of time.

One object of the present invention to provide an effective method of treating water with halogenated and non-halogenated oxidizers. The inventive system has demonstratable advantages over systems utilizing either halogen or non-halogen oxidizing systems alone, as well as advantages over the simple combination of chlorine with hydrogen peroxide.

Further objects and advantages of the present invention will be apparent from the following description.

DESCRIPTION OF THE PREFERRED EMBODIMENT

For the purposes of promoting an understanding of the principles of the invention, reference will now be made to preferred embodiments and specific language will be used to describe the same. It will nevertheless be understood that no limitation of the scope of the invention is thereby intended, such alterations and further modifications in the described compositions and methods, and such further applications of the principles of the invention as illustrated therein being contemplated as would normally occur to one skilled in the art to which the invention relates.

As indicated above, one aspect of the present invention provides a method for simultaneously using hydrogen peroxide and halogen oxidizers in water systems such as swimming pools. Previously, halogen oxidizers could not be used with hydrogen peroxide because halogens and hydrogen peroxide are generally known to be incompatible.

In one preferred embodiment of the present invention a halogen-containing compound is combined with an activated amine to produce a haloamine that is capable of coexisting in water with hydrogen peroxide. Most preferably, the halogen is chlorine, the activated amine is sulfamic acid, and the haloamine that is produced is chlorosulfamate. Surprisingly, it has been found that chlorosulfamate is compatible with hydrogen peroxide at the concentration levels normally found is swimming pool water.

In one preferred embodiment the haloamine is added to water that has previously been treated with hydrogen peroxide. In other embodiments though, the haloamine may be added to the water first, or the hydrogen peroxide and the haloamine may be added to the water simultaneously.

Further, it is to be appreciated that the haloamine can be made in situ by adding both a halogen source and an activated amine to the water to be treated. Alternatively, the halogen and the amine may be combined prior to addition to the water being treated. Again, it is understood that the peroxygen oxidizer can be added to the water either prior or after the halogen source and the activated amine. Most preferably, the activated amine is added to water that already contains a peroxygen oxidizer, and then the halogen is added to that mix.

As to the various components used in the present invention, the halogen source can be provided by any source providing free and/or combined halogen. For example, dichloroisocyanurate, trichloroisocyanurate, chloroglycoluril, bromoglycoluril, chlorodimethylhydantoin, dichlorodimethylhydantoin, bromochlorodimethylhydantoin, dichlorodimethylhydantoin dibromodimethylhydantoin, hypochlorous acid, and salts of hypochlorite or hypobromite may be used.

The halogen source may be added via a device or method capable of providing free halogen in situ. For example, the halogen may be supplied by an appropriate chemical carrier (such as a halohydantoin) or may be produced by a chemical process (e.g., bromide activation with free chlorine). Alternatively, the halogen may be provided by a device such as a chlorinator capable of generating oxidizing free halogen in situ.

The halogen source can also be dispensed by means of a feeder or erosion control device, although chemical control of erosion or the manual addition directly to the pool or other body of water is used in alternative embodiments. In one preferred embodiment compressed halogen source is placed directly in the pool's skimmer.

Most preferably, the halogen source added using 0.1 pound to five pound compressed sticks, and particularly using sticks weighing 0.5 pounds to one pound. Halogen levels of 0.1 ppm to about 100 ppm may be used in certain preferred embodiments.

As to the activated amine that is combined with the halogen oxidizer, the activated amine is any amine that bonds to a halogen to produce an N-haloamine that is capable of coexisting in water with hydrogen peroxide. In the most preferred embodiment the activated amine is sulfamic acid, which combines with halogen to produce a halosulfamate.

Preferably, about 0.5 to about 7 pounds of amine is provided per 10,000 gallons of water to be treated. Specific amounts may vary with the amine and the halogen being used.

One preferred embodiment uses the N-haloamine in combination with trichloroisocyanurate blended with an erosion control compound such as glycoluril. One stick will be added for every five to ten thousand gallons of water. Each stick preferably contains 80–91 wt % N-haloamine and 1–20 wt % of an erosion control agent such as but not limited to glycoluril.

In alternative embodiments, bromochlorodimethylhydantoin (BCDMH) could substitute for trichloroisocyanurate as could other forms of chlorine or bromine. Additionally, compressed, BCDMH and trichloroisocyanurate could also contain any form of boron (e.g., sodium tetraborate or boric acid), clarifiers, or other additives to enhance performance, stability or appearance.

As indicated above, the activated amine can be combined with the halogen prior to addition to the water to be treated. When combined, the halogen source and the activated amine are storage stable. In one form of the invention, admixing sulfamic acid and a halogen, for example, an alkali metal or alkaline earth salt of hypochlorite (e.g., calcium hypochlorite, lithium hypochlorite, or sodium hypochlorite) provides N-chlorosulfamate (NCS), which can be stored for use to treat water at a later time.

The N-chlorosulfamate can also be combined with an erosion control agent. The combined mixture of the halogen source and the activated amine can be provided as a solid composition at ambient temperature, which can be compressed into convenient-to-use tablets, sticks and the like for addition to water.

As to the hydrogen peroxide that is used in the present invention, common, commercial hydrogen peroxide is used. As indicated above, the hydrogen peroxide can be added to the water either prior to or subsequent to the addition of the halogen source and the activated amine. The hydrogen peroxide may be added via a metering device, manually or produced on site with a peroxide generator. In some preferred embodiments the hydrogen peroxide is added to the water via liquid hydrogen peroxide, although solid peroxide releasing compounds or peroxide generators may also be used.

While not required to practice this invention, the peroxide can also be stabilized with a polyquaternary ammonium compound such as but not limited to Q6/6 or PDED. Additionally, chelating agents such as ethylenediaminetetraacetate (EDTA) or phosphophonate compounds could be mixed with the peroxide or added separately as ancillary stabilizers.

In one preferred embodiment the hydrogen peroxide is provided to the water by adding one half gallon per week of a 0.5–50% solution for every 10,000 gallons of water (27–30% would be the ideal). Preferably the hydrogen peroxide is maintained in the water at a level of about 10 ppm to about 70 ppm. More preferably the hydrogen peroxide is maintained in the water at a level of about 20 ppm to about 50 ppm.

Another preferred embodiment uses regular applications of chelating agents such as but not limited to EDTA or phosphonates to remove metals which might degrade hydrogen peroxide. EDTA should generally be used in concentrations ranging from 0.1–50 ppm. The preferred concentration range is 1–10 ppm.

Another preferred embodiment uses a specialized sand matrix that has silver permanently attached to its granules. The silver provides in situ biocidal activity to retard microbial fouling in the filter.

Another preferred embodiment uses a boron containing compound such as sodium perborate, boric acid, or sodium tetraborate to establish a boron level between 1 and 100 ppm, most preferably between 25 and 80 ppm. The boron containing compound(s) would be added at the beginning of the pool season, using subsequent doses as needed to maintain the desired concentration.

Another preferred embodiment uses periodic (weekly, bi-weekly or monthly) shock treatments (halogen or peroxygen) consisting of one or more of the following: chlorine, potassium peroxymonopersulfate, sodium bromide, sodium perborate, sodium percarbonate, aluminum sulfate, sodium tetraborate and sodium persulfate. Shock treatment will help to destroy organic compounds that cause oxidizer demand.

As is known in the art, the shock treatment provides 5–20 ppm active halogen when halogen shock treatments are used. To provide that amount, the actual shock treatment may use 1–100 ppm active halogen. When non-halogen shock treatments are used the active oxygen is provided at an equivalent peroxide level of about 1–100 ppm or more, most preferably between about 10 and 30 ppm.

Another preferred embodiment uses dry or liquid peroxygen sources or peroxyacids (such as peracetic acid) as maintenance or shock treatments. The peroxyacids would provide an additional peroxygen boost for the treatment system. Peroxyacid concentrations may range between 0.1 and 200 ppm, but the preferred range is 5–30 ppm.

Another preferred embodiment uses monomeric, dimeric or oligomeric surface active agents such as but not limited to alkyldimethylbenzyl ammonium chloride, didecyldimethyl-ammonium chloride, dodecylguanidine hydrochloride to enhance the system's performance. These non-polymeric surfactants could be blended with hydrogen peroxide and polyquats and would preferably deliver concentrations ranging from 0.1–75 ppm in the treated water. Ideal concentrations are 1–4 ppm.

The peroxidizer can be combined with a polyquaternary ammonium salt. A chelating agent such as ethylene diamine tetracetic acid (EDTA) can also used, preferably as the third step of the new water treatment system. In some embodiments, a fourth step comprising periodic shock treatments is also performed.

Addition of the halogen source to the activated amine provides a source of a halogen oxidizer, which can be combined with a peroxygen oxidizer in water to maintain measurable quantities of both oxidizers for an extended period of time. Thus, use of this invention provides a method of maintaining both a halogen oxidizer and a peroxygen oxidizer in the same body of water without the need for continuous addition of either the halogen oxidizer or the peroxygen oxidizer to effectively treat water and yet maintain water quality over an extended time period.

When used in accordance with this invention, the halogen oxidizer can be maintained in water that includes a peroxygen source, such as hydrogen peroxide, without significant degradation of the halogen source. In one preferred embodiment, water containing 1–100 ppm of hydrogen peroxide is treated with a halogen source and an activated amine. The activated amine and the halogen source are combined to provide N-chlorosulfamate, which is added to the hydrogen peroxide treated water. The degradation rate for N-chlorosulfamate in the treated water was determined to be about 0.2 ppm/hr.

Further, the halogen oxidizer can be maintained in hydrogen peroxide treated water at a concentration level effective to inhibit bacteria and/or algae growth in the water. Preferably, the halogen oxidizer can be maintained at a concentration level of between about 0.5 ppm to about 4 ppm. More preferably, the halogen oxidizer can be maintained between about 1 ppm to about 3 ppm.

Furthermore, use of this invention provides a method of maintaining higher quality water with less total amount of oxidizers than use of either a halogen oxidizer or a peroxygen oxidizer alone. It has been determined that combined use of an activated amine, such as sulfamic acid, and a halogen source in the presence of hydrogen peroxide provides significantly enhanced efficacy against bacteria and algae organisms in water.

Reference will now be made to specific examples using the processes described above. It is to be understood that the examples are provided to more completely describe preferred embodiments, and that no limitation to the scope of the invention is intended thereby.

EXAMPLE 1

A stabilized chlorine source was prepared by admixing sodium hypochlorite with a slight molar excess of sulfamic acid to form the N-chlorosulfamate. The efficacy of the stabilized chlorine and free chlorine was evaluated by determining the Minimal Inhibitory Concentrations (MIC) for each to four microorganisms. The MIC is defined as the lowest concentration of a biocide that completely inhibits the growth of a microorganism for a given period of time. The results are tabulated in Table 1.

Example 1 shows that chlorine stabilized as an N-chlorosulfamate is efficacious against both bacterial and alga microorganisms. Although not as effective as free chlorine with respect to some microorganisms, the fact that the chlorosulfamate did inhibit all microorganisms tested is evidence of sanitizing efficacy.

TABLE 1

MICS of Free Chlorine and N-haloamine Against Bacteria and Algae

| ORGANISM | TYPE | FREE CHLORINE MIC (ppm) | N-HALOAMINE MIC (ppm) |
| --- | --- | --- | --- |
| A. cylindrica | Alga | 0.625 | 3 |
| Phormidium sp. | Alga | 0.625 | 0.625 |
| E. coli | Bacterium | 31.2 | 15.6 |
| P. aeruginosa | Bacterium | 3.12 | 15.6 |

EXAMPLE 2

It is known that water treated with hydrogen peroxide ($H_2O_2$) occasionally develops fishy odors caused by trimethylamine (TMA). Free chlorine readily oxidizes alkyl amines such as TMA to dichloroalkyl amines, which do not exhibit a pungent odor. Sealed jars containing pool water with 53 ppm $H_2O_2$ and 19 ppm TMA were spiked with 40 ppm of free chlorine or N-haloamine. The samples were analyzed the following day for TMA. The results are tabulated in Table 2.

Example 2 shows that the N-haloamine is as effective as free chlorine in reducing TMA concentrations in the presence of hydrogen peroxide.

TABLE 2

Trimethyl Amine Destruction with Free Chlorine or N-Haloamine

| SAMPLE | TMA REMAINING (PPM) |
| --- | --- |
| (Control) | 19 |
| Free chlorine | 13 |
| N-haloamine | 13 |

EXAMPLE 3

A 1550 gallon, outdoor spa was dosed with $H_2O_2$ and an N-haloamine (N-chlorosulfamate). The spa was exposed to sunlight for most of the day and was subjected to an extraneous oxidizer demand from windblown dust and debris. Water samples were collected from the spa and analyzed to determine concentration levels of $H_2O_2$ and the N-haloamine. The results are tabulated in Table 3.

Example 3 shows that $H_2O_2$ and the chlorosulfamate were capable of co-existing within the same body of water, even under the duress caused by sunlight and environmental demand. These data are especially surprising since $H_2O_2$ is known to neutralize unstabilized chlorine in a matter of minutes or less.

TABLE 3

Half Lives of $H_2O_2$ and N-Haloamine in Pool Water

| DATE | TIME | $H_2O_2$ PPM | N-CHLORO-SULFAMATE PPM | OBSERVATIONS |
| --- | --- | --- | --- | --- |
| 6/11/98 | 9:15 AM | 4.39 | — | Added hydrogen |

TABLE 3-continued

Half Lives of $H_2O_2$ and N-Haloamine in Pool Water

| DATE | TIME | $H_2O_2$ PPM | N-CHLORO-SULFAMATE PPM | OBSERVATIONS |
|---|---|---|---|---|
| | 9:45 AM | 32.4 | — | peroxide and EDTA. |
| | 9:50 AM | — | — | Added N-chlorosulfamate to give ca. 10 ppm. |
| | 10:30 AM | 32 | 7.7 | |
| | 5:00 PM | 30 | 6.4 | |
| 6/12/98 | 8:15 AM | 28 | 4.4 | |
| | 5:00 PM | 20.4 | 2.42 | |

It is to be appreciated that the halogen source and hydrogen peroxide coexist in the water, and that it is not necessary to continually add each component. Instead, the components may be added daily, or less often, and the water recirculated to allow both components to circulate freely throughout the water system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A composition for water treatment comprising water, about 0.5 to about 4 ppm of a haloamine and about 10 to about 70 ppm of hydrogen peroxide.

2. The composition of claim 1 wherein the haloamine includes N-chlorosulfamate.

* * * * *